United States Patent
Kihara

(10) Patent No.: US 10,928,597 B2
(45) Date of Patent: Feb. 23, 2021

(54) LIGHT EMITTING MODULE

(71) Applicant: SUMITOMO ELECTRIC DEVICE INNOVATIONS, INC., Kanagawa (JP)

(72) Inventor: Toshiaki Kihara, Yokohama (JP)

(73) Assignee: SUMITOMO ELECTRIC DEVICE INNOVATIONS, INC., Kanagawa (JP)

(*) Notice: Subject to any disclaimer, the term of this patent is extended or adjusted under 35 U.S.C. 154(b) by 0 days.

(21) Appl. No.: 16/559,890

(22) Filed: Sep. 4, 2019

(65) Prior Publication Data

US 2020/0081203 A1 Mar. 12, 2020

(30) Foreign Application Priority Data

Sep. 6, 2018 (JP) .............................. JP2018-166795

(51) Int. Cl.
*G02B 6/42* (2006.01)

(52) U.S. Cl.
CPC ............ *G02B 6/421* (2013.01); *G02B 6/4246* (2013.01); *G02B 6/4271* (2013.01); *G02B 6/4286* (2013.01)

(58) Field of Classification Search
None
See application file for complete search history.

(56) References Cited

U.S. PATENT DOCUMENTS

| 5,029,963 | A * | 7/1991 | Naselli | G02B 6/08 313/370 |
| 6,236,512 | B1 * | 5/2001 | Nakai | G02B 26/124 359/641 |
| 6,560,038 | B1 * | 5/2003 | Parkyn, Jr. | F21V 5/04 359/726 |
| 8,511,876 | B2 * | 8/2013 | DeWitt | G02B 6/4206 362/311.06 |
| 10,775,572 | B1 * | 9/2020 | Veitch | G02B 6/4212 |
| 2005/0078383 | A1 * | 4/2005 | Jones | G02B 6/4206 359/717 |
| 2010/0208487 | A1 * | 8/2010 | Li | G02B 6/4298 362/554 |
| 2016/0170151 | A1 * | 6/2016 | Baribault | G02B 6/381 356/73.1 |
| 2019/0018179 | A1 * | 1/2019 | Kurokawa | G02B 5/3025 |
| 2020/0081203 | A1 * | 3/2020 | Kihara | G02B 6/421 |

FOREIGN PATENT DOCUMENTS

JP 2001-281501 10/2001

* cited by examiner

*Primary Examiner* — Tina M Wong
(74) *Attorney, Agent, or Firm* — Smith, Gambrell & Russell, LLP.

(57) ABSTRACT

A light emitting module including a semiconductor light emitting element, a first lens, a second lens, and an optical fiber stub, is disclosed. The first lens collimates light output from the semiconductor light emitting element. The second lens is a meniscus lens and condenses the collimated light to the optical fiber stub. A light entering surface of the second lens has a cross-sectional shape in which an increase rate of a curvature radius is zero or more. A light exiting surface of the second lens includes a first region and a second region. The first region has a cross-sectional shape in which a sign of the increase rate of the curvature radius is positive. The second region surrounds the first region and has a cross-sectional shape in which a sign of the increase rate of the curvature radius is negative.

7 Claims, 15 Drawing Sheets

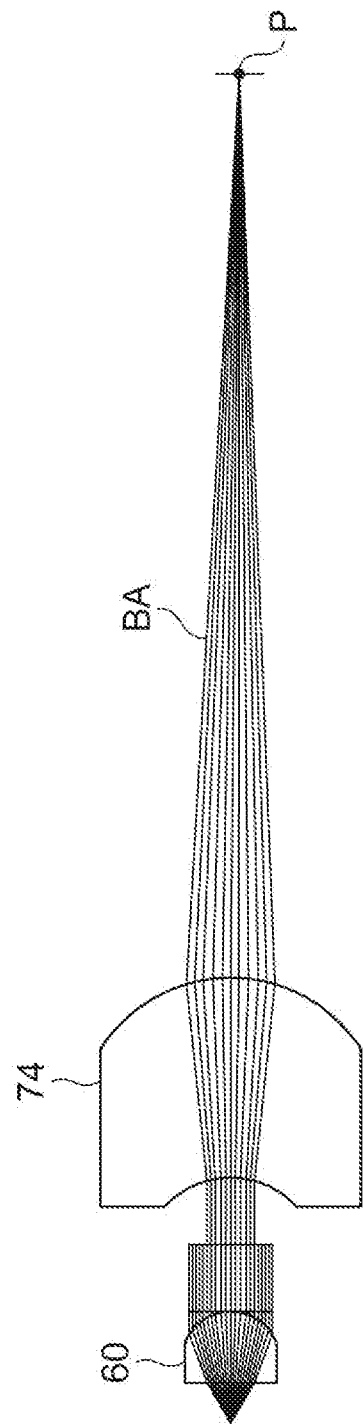
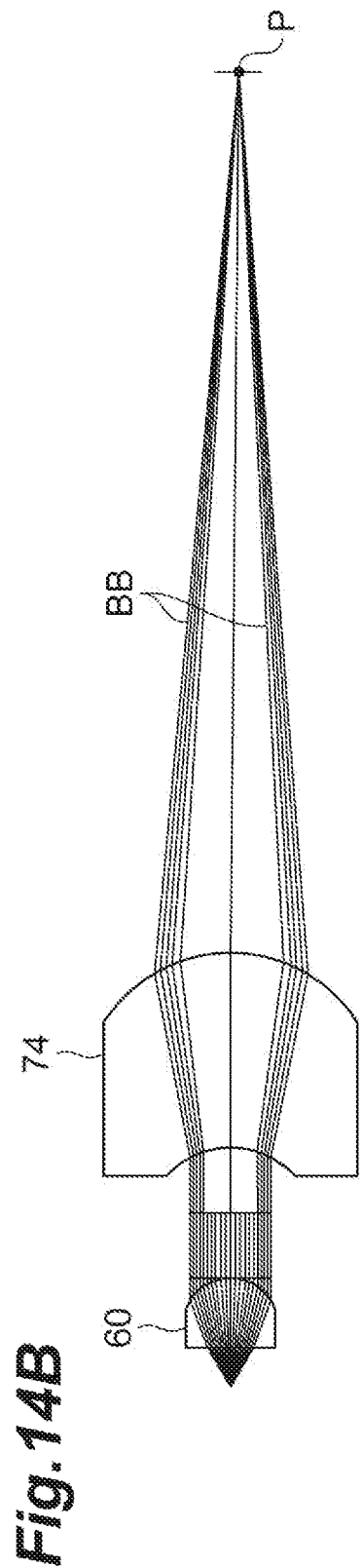
Fig. 14A
Fig. 14B

LIGHT EMITTING MODULE

CROSS REFERENCE

The present application is based upon and claims the benefit of the priority from Japanese Patent Application No. 2018-166795 filed on Sep. 6, 2018, the entire contents of which are incorporated herein by reference.

TECHNICAL FIELD

The present disclosure relates to a light emitting module.

BACKGROUND

JP2001-281501A discloses a technique relating to a laser diode module and its assembly method. The laser diode module described in this document includes a laser diode assembly and a lens-fiber assembly fixed to each other. The laser diode assembly includes a carrier and a laser diode fixed to the carrier. The laser diode is surrounded by a cap. The cap includes a laser beam transmission window. The lens-fiber assembly includes first and second holes communicating with each other. An aspherical lens is inserted and fixed to the first hole. A ferrule which accommodates an optical fiber is press-inserted into the second hole. The aspherical lens condenses light output from the laser diode toward the optical fiber.

SUMMARY

The present disclosure provides a light emitting module. The light emitting module includes a semiconductor light emitting element, a first lens, a second lens, and an optical fiber stub. The first lens is optically coupled to the semiconductor light emitting element to collimate light output from the semiconductor light emitting element. The second lens is a meniscus lens. The meniscus is optically coupled to the semiconductor light emitting element through the first lens to condense the collimated light. The optical fiber stub is optically coupled to condensed light output from the second lens. A light entering surface of the second lens has a cross-sectional shape in which an increase rate of a curvature radius with respect to a distance from an optical axis of the second lens is zero or more. A light existing surface of the second lens includes a first region and a second region. The first region has a cross-sectional shape in which a sign of the increase rate of the curvature radius with respect to the distance from the optical axis is positive. The second region surrounds the first region and has a cross-sectional shape in which a sign of the increase rate of the curvature radius with respect to the distance from the optical axis is negative.

BRIEF DESCRIPTION OF THE DRAWINGS

The foregoing and other purposes, aspects and advantages will be better understood from the following detailed description of embodiments of this disclosure with reference to the drawings, in which:

FIGS. 14A and 14B are diagrams conceptually illustrating a state in which light passing through the condenser lens is divided into an inner beam and an outer beam.

DETAILED DESCRIPTION

Figure 1:
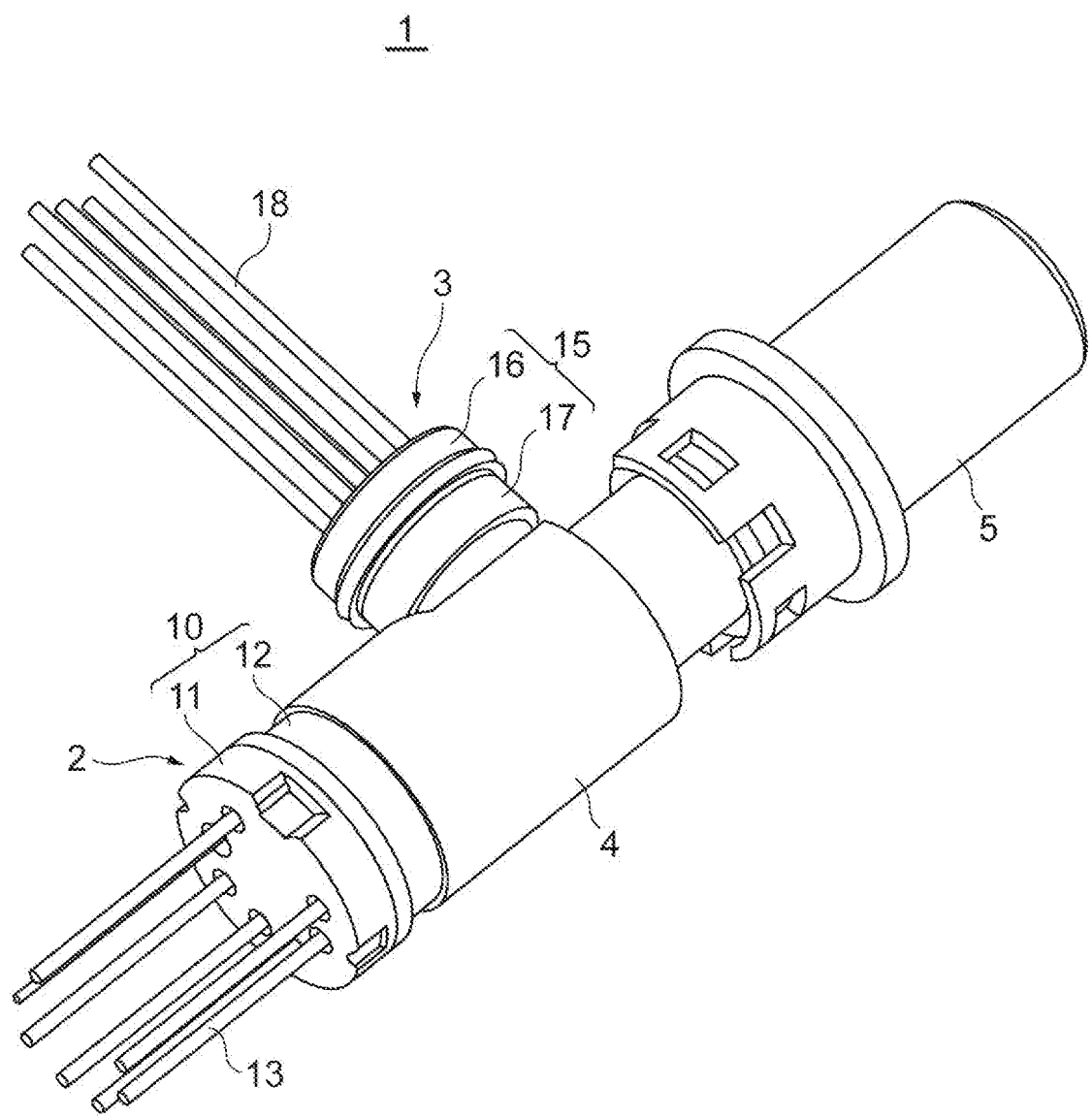
FIG. 1 is a perspective view illustrating a Bidirectional Optical Sub-Assembly (BOSA) including a light emitting module according to an embodiment.

Problem to be Solved by the Present Disclosure

As an optical transmitter in an optical communication system, a light emitting module including a semiconductor light emitting element such as a laser diode is used. For example, in the laser diode module described in JP2001-281501A, light emitted from a laser diode accommodated in a package including a stein and a cap is condensed by a aspherical lens located outside the package.

In such a light emitting module, it is important to improve a light coupling efficiency between the semiconductor light emitting element and the optical fiber. When the light emitted from the semiconductor light emitting element is guided to the optical fiber through a condenser lens, it is required to improve relative position accuracy by performing alignment among the semiconductor light emitting element, the condenser lens, and the optical fiber. Thus, it is considered to use two lenses instead of a single condenser lens used in the module described in JP2001-281501A. That is, the light output from the semiconductor light emitting element is collimated by the first lens, and the collimated light is condensed to the optical fiber by the second lens. According to such a configuration, it is possible to improve the light coupling efficiency between the semiconductor light emitting element and the optical fiber by improving alignment accuracy as compared with a case in which the single condenser lens is used.

When first and second lenses are interposed between the semiconductor light emitting element and the optical fiber, there is a tendency that a distance (back focus) between the second lens and the optical fiber is shortened as compared with a case in which the single condenser lens is used. However, it is required to lengthen the distance between the second lens and the optical fiber depending on the structure of the light emitting module. In such a case, a meniscus lens can be used as the second lens. However, a positional shift (axial shift), that is, decentering between the optical axis of a light entrance surface of the meniscus lens and the optical axis of a light exiting surface of the meniscus lens largely affects the light coupling efficiency between the semiconductor light emitting element and the optical fiber. The decentering is caused by a relative positional shift between a mold forming the light entering surface of the meniscus lens and a mold forming the light exiting surface thereof. Therefore, since the size of the decentering depends on the accuracy of the mold, there is a limitation in suppression of the decentering.

Advantageous Effect of the Present Disclosure

According to the present disclosure, a decrease degree of light coupling efficiency due to the decentering of the second lens is reduced in a light emitting module that condenses light emitted from the semiconductor light emitting element by using the first and second lenses.

DESCRIPTION OF THE EMBODIMENTS OF THE PRESENT DISCLOSURE

The contents of the embodiment of the present disclosure will be described. A light emitting module according to an embodiment includes a semiconductor light emitting element, a first lens, a second lens, and an optical fiber stub. The first lens is optically coupled to the semiconductor light emitting element to collimate light output from the semiconductor light emitting element. The second lens is a meniscus lens. The meniscus lens is optically coupled to the semiconductor light emitting element through the first lens to condense collimated light. The optical fiber stub is optically coupled to condensed light output from the second lens. A light entering surface of the second lens has a cross-sectional shape in which an increase rate of a curvature radius with respect to a distance from an optical axis of the second lens is zero or more. A light exiting surface of the second lens includes a first region and a second region. The first region has a cross-sectional shape in which a sign of the increase rate of the curvature radius with respect to the distance from the optical axis is positive. The second region surrounds the first region, and has a cross-sectional shape in which a sign of the increase rate of the curvature radius with respect to the distance from the optical axis is negative.

In the light emitting module, light output from the semiconductor light emitting element first reaches the first lens, and is output from the first lens as collimated light. Next, the collimated light reaches the second lens, and is condensed by the second lens. Since the light emitting module includes the first and second lenses, alignment accuracy is high as compared with a case in which a single lens is included. Accordingly, the light coupling efficiency between the semiconductor light emitting element and the optical fiber can be improved. Further, since the second lens is the meniscus lens, the back focus of the second lens can be lengthened.

Further, in the light emitting module, in the light entering surface of the second lens, the increase rate of the curvature radius with respect to the distance from the optical axis is zero or more. Furthermore, in the light exiting surface of the second lens, a sign of the increase rate of the curvature radius with respect to the distance from the optical axis is positive in the first region, and a sign of the increase rate of the curvature radius with respect to the distance from the optical axis is negative in the second region surrounding the first region. According to the experiment of the inventor, since the second lens which is a meniscus lens has the above mentioned shape, wavefront aberration and coma aberration caused by the decentering of the second lens can be reduced. Thus, the light emitting module can reduce a decrease degree of the light coupling efficiency due to the decentering of the second lens.

The light emitting module may further include a package accommodating the semiconductor light emitting element and the first lens therein. The package may include an opening through which the light emitted from the semiconductor light emitting element passes. The second lens may be attached to the opening. Accordingly, a small light emitting module can be provided.

In the light emitting module, the back focus of the second lens may be 6 mm or more. The light emitting module can achieve a long back focus as above.

The light emitting module may further include an optical member disposed between the second lens and the optical fiber stub.

In the light emitting module, a multiplication rate of a lens system including the first lens and the second lens may be 5 times or more.

In the light emitting module, the first region may have a circular shape centered on the optical axis.

In the light emitting module, the second region may be an annular shape centered on the optical axis.

DETAILED DESCRIPTION OF THE EMBODIMENT OF THE PRESENT DISCLOSURE

A detailed example of the light emitting module according to the embodiment of the present disclosure will be described below with reference to the drawings. Furthermore, it is intended that the invention is not limited to these examples, is shown by claims, and includes meaning equivalent to claims and all modifications within that scope. In the description below, the same reference numerals will be given to the same components in the description of the drawings and a redundant description thereof will be omitted.

FIG. 1 is a perspective view illustrating a bidirectional light transmitting/receiving module, which is a bidirectional Optical Sub-Assembly (BOSA), including a light emitting module according to an embodiment. A light transmitting/receiving module 1 is used as, for example, an optical transceiver such as 10 gigabit Ethernet passive optical network (10G-EPON), XG-PON, NG-PON, NG-PON2, and 25G-PON.

The light transmitting/receiving module 1 includes a light emitting module 2, a light receiving module 3, a joint 4, and a sleeve 5. The joint 4 and the sleeve 5 have a cylindrical shape having a common center axis. One end of the sleeve 5 is fixed to one end of the joint 4 in the longitudinal direction. An optical fiber is inserted into the other end of the sleeve 5 along with a ferrule attached to the front end portion of the optical fiber. An optical fiber stub OS is located inside the sleeve 5. The front end of the optical fiber comes into contact with one end of the optical fiber stub OS to be optically connected to the optical fiber stub OS.

The light emitting module 2 is fixed to the other end of the joint 4 and outputs transmission light toward hole formed inside the joint 4. The transmission light passes through the hole formed inside the joint 4 and reaches the other end of the optical fiber stub OS. The light emitting module 2 includes a package 10 and a semiconductor light emitting element. The package 10 includes a stein 11 and a cap 12. The semiconductor light emitting element is a laser diode located in the package 10. A plurality of lead pins 13 penetrate the stein 11, and a power voltage and an electric transmission signal are provided for the inside of the package 10 through the lead pins 13. The power voltage and the electric transmission signal are for driving the semiconductor light emitting element.

The light receiving module 3 is fixed to a side surface of the joint 4. The light receiving module 3 receives reception light that is output from the optical fiber and then passes through the hole formed inside the joint 4. The light receiving module 3 includes a package 15 and a light receiving element. The package 15 includes a stein 16 and a cap 17. The light receiving element is a photodiode located in the package 15. A plurality of lead pins 18 penetrate the stein 16. A bias voltage applied to the light receiving element is provided for the inside of the package 15 through the lead pins 18. An electric reception signal generated by the light receiving element is provided for the outside of the package 15 through the lead pins 18.

A wavelength demultiplexing filter is located inside the joint 4. The transmission light output from the light emitting module 2 passes through the wavelength demultiplexing filter, and then enters the optical fiber stub OS. The reception light emitted from the optical fiber through the optical fiber stub OS is reflected by the wavelength demultiplexing filter, and then reaches the light receiving module 3. An isolator may be further disposed between the wavelength demultiplexing filter and the light emitting module 2.

In the embodiment, the light transmitting/receiving module 1 including both of the light emitting module 2 and the light receiving module 3 has been exemplified, but a light emitting module may be included in an optical transmission module, which is Transmitter Optical Sub-Assembly (TOSA), only including the light emitting module 2. Alternatively, a light emitting module may be included in an integrated optical transmission module obtained by arranging a plurality of light emitting modules 2 having different wavelengths and by integrating optical beams having these wavelengths by optical components such as filters and mirrors.

Figure 2:
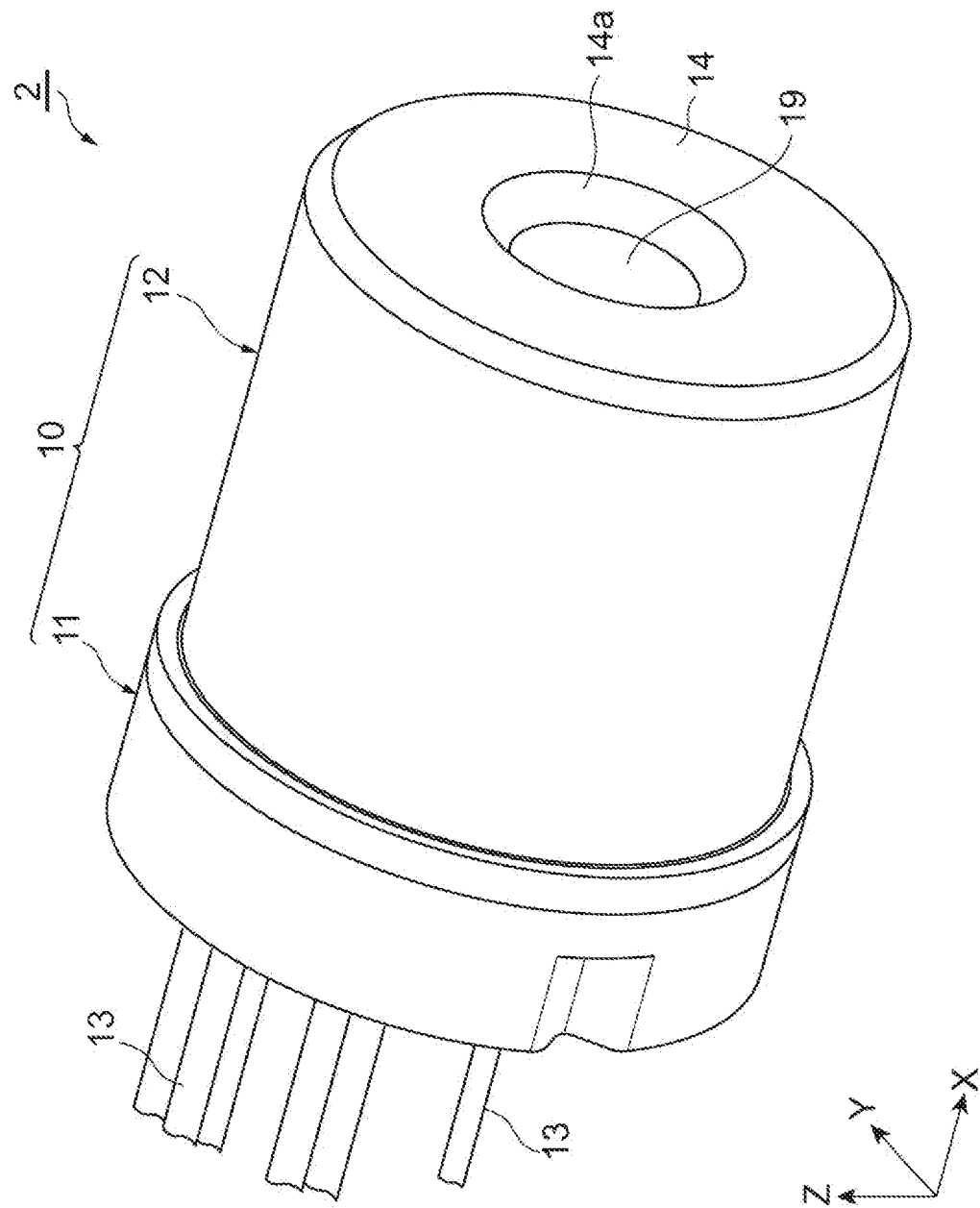
FIG. 2 is a perspective view illustrating an appearance of the light emitting module.
Figure 3:
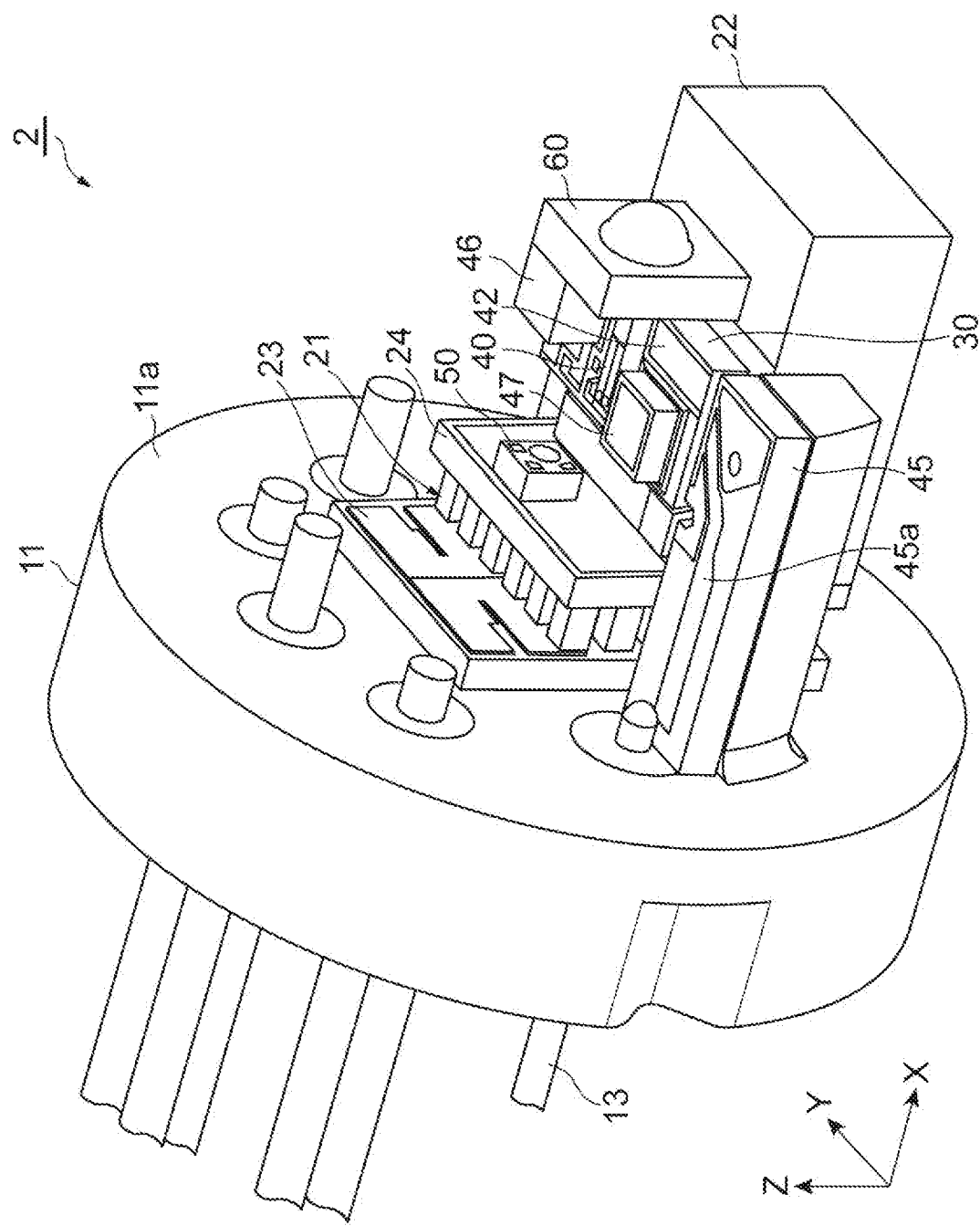
FIG. 3 is a perspective view illustrating the light emitting module from which a cap is removed.
Figure 4:
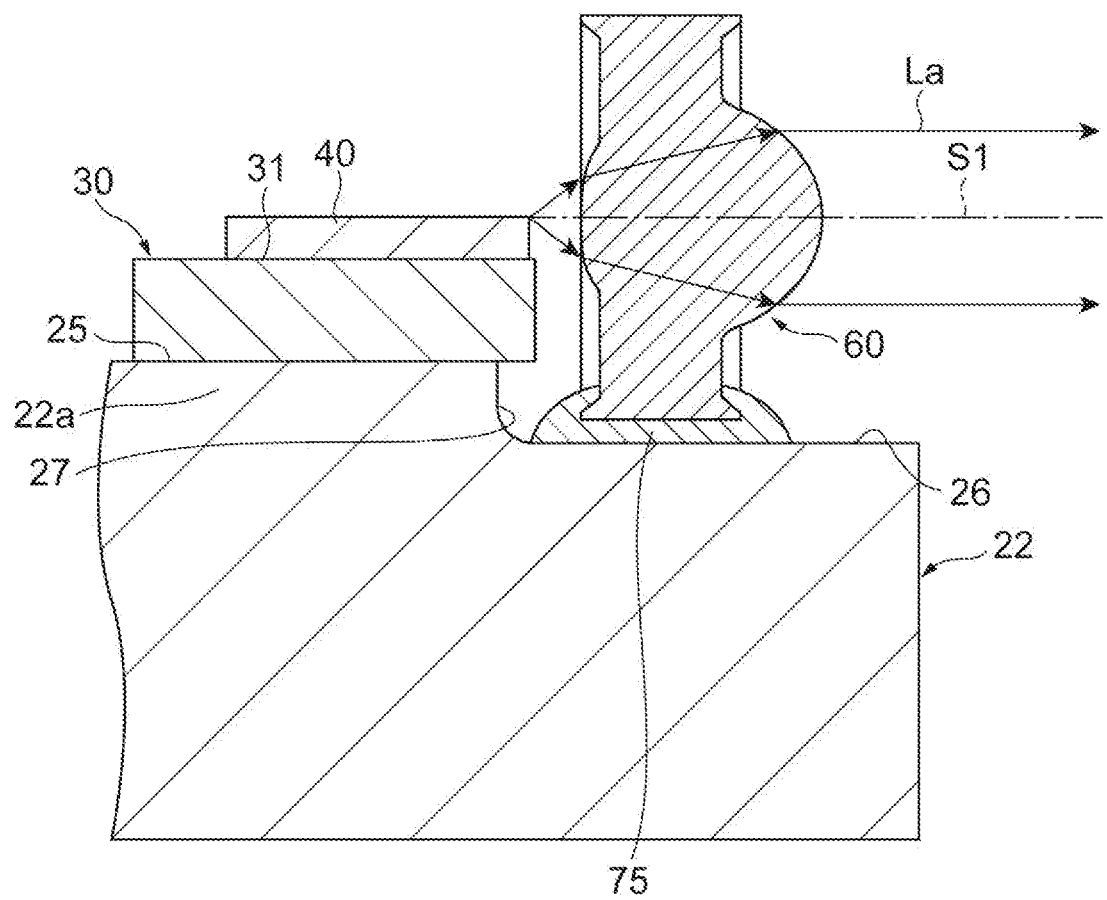
FIG. 4 is a cross-sectional view of a partially enlarged inner structure of the light emitting module.

FIG. 2 is a perspective view illustrating an appearance of the light emitting module 2. FIG. 3 is a perspective view illustrating the light emitting module 2 from which the cap 12 is removed. FIG. 4 is a cross-sectional view illustrating a partially enlarged inner structure of the light emitting module 2. In these drawings, an XYZ orthogonal coordinate system is illustrated. The X axis follows the optical axis of the light emitting module 2 and the center axes of the joint 4 and the sleeve 5 illustrated in FIG. 1. Hereinafter, a description will be made on the assumption that the Z-axis direction is the up and down direction and the Y-axis direction is the left and right direction.

As described above, the light emitting module 2 includes the package 10. The package 10 is a so-called CAN package and includes the stein 11 and the cap 12. Both of the stein 11 and the cap 12 are formed of metal. The stein 11 and the cap 12 are bonded to each other by resistance welding, and a space inside the package 10 is kept airtight. The stein 11 is formed in a substantially circular plate shape, and includes a main surface 11a which faces an inner space of the package 10. The plurality of lead pins 13 penetrate the stein 11, and are used as terminals for supplying electric power, grounding, and inputting/outputting electric signals. The cap 12 has a substantially cylindrical shape and includes an end wall 14 formed in one axial end. A circular opening 14a is formed at the center of the end wall 14. A condenser lens 19 is attached into the opening 14a. When the light emitting module is mounted on a small optical transceiver such as Small Form-factor Pluggable (SFP) or SFP+, the diameter (the outer diameter size) of the package 10 may be 5.6 mm as an example.

A thermoelectric conversion element 21, a carrier 22, a sub-carrier 30, a semiconductor laser chip 40 which is a semiconductor light emitting element, a monitor photodiode (monitor PD) 50, and a lens 60 are accommodated in the package 10.

The thermoelectric conversion element 21 is, for example, a Peltier element. The thermoelectric conversion element 21 is formed such that one surface is one of a heat absorption surface or a heat dissipation surface and the other surface is the other of the heat absorption surface or the heat dissipation surface in response to the direction of the supply current. The thermoelectric conversion element 21 is located between a pair of plate-shaped bodies 23 and 24. The thermoelectric conversion element is located on the main surface 11a of the stein 11 the plate-shaped body 23. These plate-shaped bodies 23 and 24 are formed of an insulation material, for example, AlN or $Al_2O_3$. Since the thermoelectric conversion element 21 is located inside the package 10, the temperature of the semiconductor laser chip 40 is kept constant. Accordingly, a high-speed optical communication at, for example, 10 Gbps or 25 Gbps can be performed. The temperature of the semiconductor laser chip 40 is adjusted in a wide temperature range, for example, from −40° C. to 80° C.

The sub-carrier 30 is formed in a rectangular plate shape and is formed of, for example, an insulation material, for example, ceramics such as AlN. The semiconductor laser chip 40 which emits light in the optical axis direction (X-axis direction) is mounted on an upper surface (main surface) 31 of the sub-carrier 30. The semiconductor laser chip 40 has a monolithic structure in which a laser diode and an optical modulator are integrated on a common substrate. The sub-carrier 30 is provided with a high-frequency wiring 42 by metallization. The high-frequency wiring 42 is electrically connected to a high-frequency wiring 45a formed on a ceramic substrate 45 disposed on the main surface 11a of the stein 11 by metallization. For example, the high-frequency wiring 42 and the high-frequency wiring 45a can be connected to each other by an Au wire having a diameter of 25 μm. The impedance is 50Ω.

In the example illustrated in the drawing, a thermistor 46 and a capacitor 47 are mounted on the upper surface of the sub-carrier 30. The thermistor 46 generates an electric signal indicating a temperature in the vicinity of the semiconductor laser chip 40. This electric signal is output to the outside of the light emitting module 2 through the lead pin 13. The thermoelectric conversion element 21 is controlled on the basis of the electric signal. The capacitor 47 is connected between a reference potential line and a bias wiring connected to the laser diode of the semiconductor laser chip 40. The capacitor 47 is provided to stabilize a bias current supplied to the laser diode.

The carrier 22 is disposed on the plate-shaped body 24. The carrier 22 is formed of the same insulation material as that of the sub-carrier 30. As illustrated in FIG. 4, the carrier 22 includes a protrusion 22a formed on an upper surface thereof. That is, the carrier 22 includes upper surfaces 25 and 26, and a connection surface 27 connecting the upper surfaces 25 and 26. The upper surface 26 is formed at a position lower than the upper surface 25. A distance between the optical axis S1 of the semiconductor laser chip 40 and the upper surface 26 is larger than a distance between the optical axis S1 and the upper surface 25. Both of the upper surfaces 25 and 26 are formed as flat surfaces, and the connection surface 27 extends in a direction perpendicular to the upper surfaces 25 and 26. Furthermore, a boundary between the connection surface 27 and the upper surface 26 may be smoothly curved. The sub-carrier 30 is mounted on the upper surface 25 of the carrier 22.

The monitor PD 50 monitors the emission light of the semiconductor laser chip 40. In the example illustrated in the drawing, the monitor PD 50 is disposed behind the semiconductor laser chip 40 on the plate-shaped body 24. The monitor PD 50 receives rear surface light emitted from the rear side of the semiconductor laser chip 40, and generates an electric signal in response to the light intensity of the rear surface light. The electric signal is output to the outside of the light emitting module 2 through the lead pin 13. The light emission intensity of the laser diode of the semiconductor laser chip 40 is controlled on the basis of the electric signal.

The lens 60 is fixed onto the upper surface 26 of the carrier 22 by an adhesive 75, and is optically coupled to the semiconductor laser chip 40. An emission light La from the semiconductor laser chip 40 enters the lens 60. As an example, the lens 60 is a surface-mounted resin lens. The adhesive 75 of the embodiment is a resin adhesive which is cured by UV rays. The lens 60 is, for example, a collimator lens which collimates the emission light La from the semiconductor laser chip 40.

Figure 5:
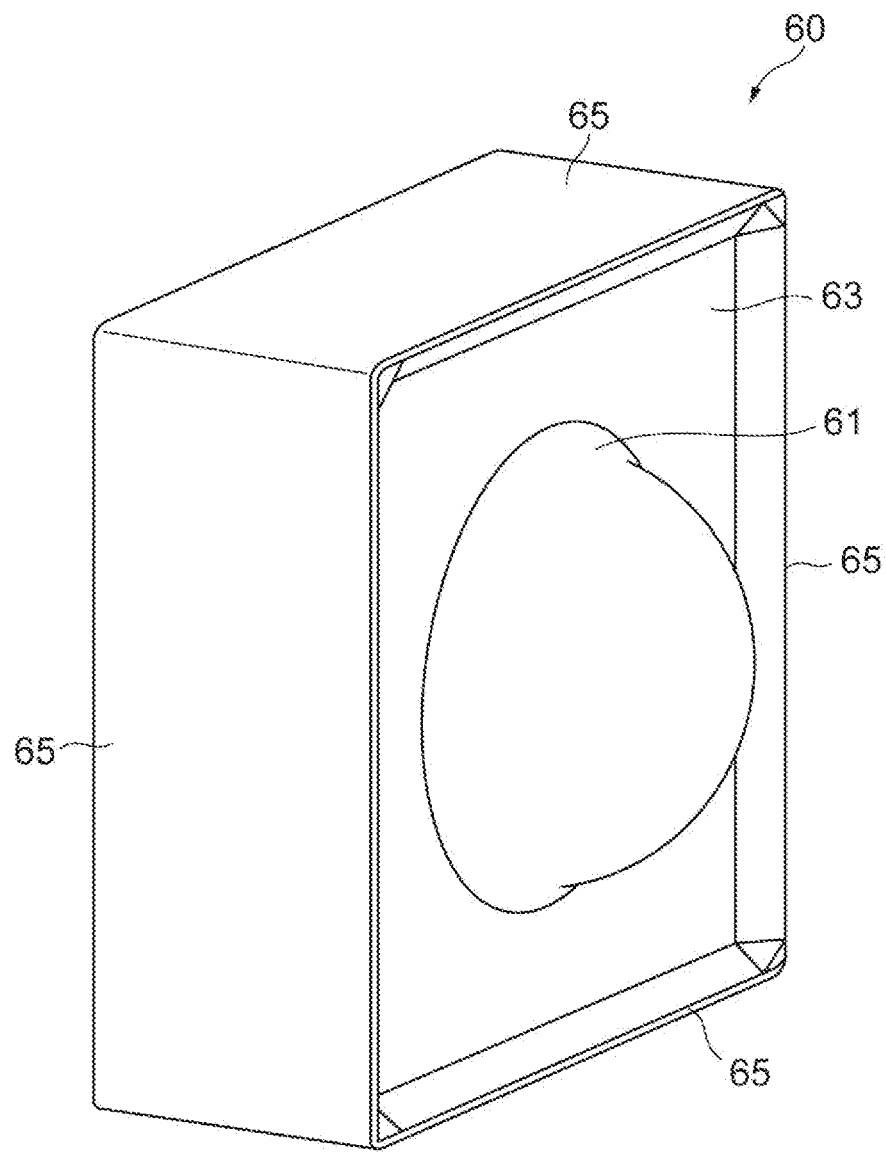
FIG. 5 is a perspective view illustrating a lens of the light emitting module.
Figure 6:
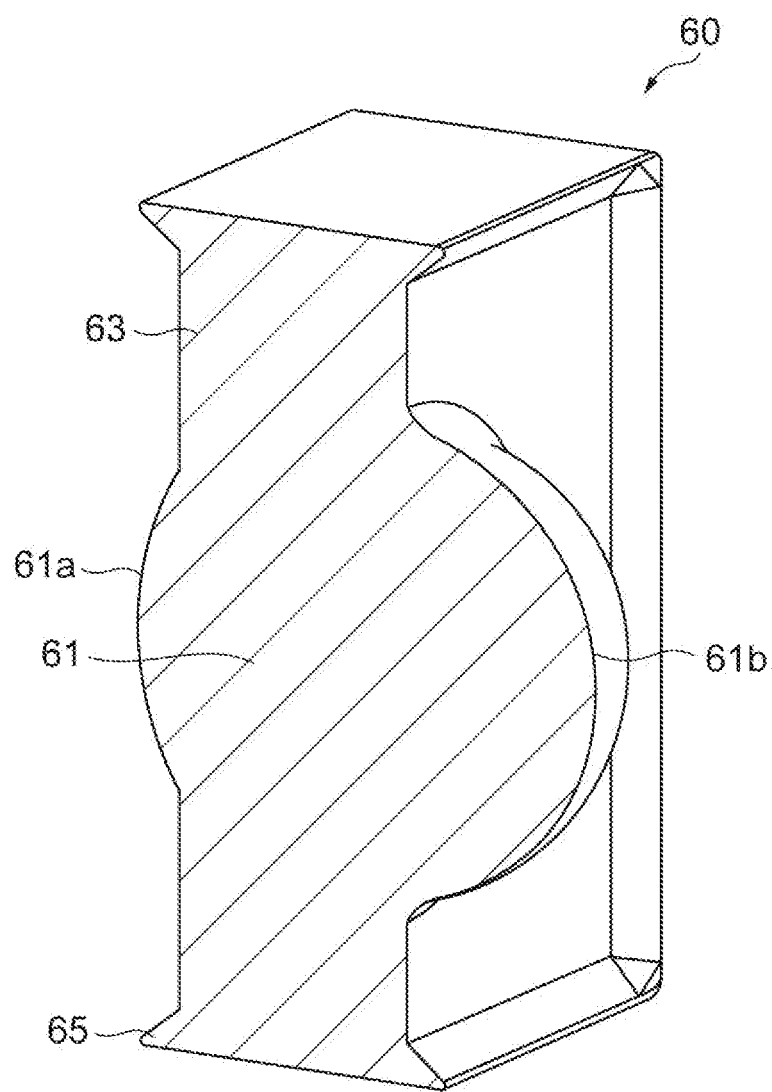
FIG. 6 is a cross-sectional perspective view illustrating the lens.

FIG. 5 is a perspective view illustrating the lens 60. FIG. 6 is a cross-sectional perspective view illustrating the lens 60. The lens 60 is formed in a substantially rectangular parallelepiped shape, and includes a lens body 61, a flange 63, and a fixed portion 65. The lens body 61 is a aspherical lens, and includes a light entering surface 61a and a light exiting surface 61b. The light emitted from the semiconductor laser chip 40 enters the light entering surface 61a, and the light entering the light entering surface 61a is output from the light exiting surface 61b. Both of the light entering surface 61a and the light exiting surface 61b are curved surfaces. In the lens 60 of the example illustrated in the drawings, the curvature of the light entering surface 61a is larger than the curvature of the light exiting surface 61b. That is, the curvature radius of the light entering surface 61a is smaller than the curvature radius of the light exiting surface 61b. This is because the distance between the light entering surface 61a and the light emission end of the semiconductor laser chip 40 is narrow and the optical flux is collimated by the light exiting surface 61b. The fixed portion 65 is a portion which is fixed to the upper surface 26 of the carrier 22 by the adhesive 75. The fixed portion 65 is formed in at least a part of the peripheral edge of the flange 63.

As an example, the external size of the lens 60 when viewed in the optical axis direction may be 0.6 mm square, 1 mm square, 1.5 mm square, 0.6 mm×1.0 mm rectangle, or the like. The thickness of the lens 60 in the optical axis direction is about 0.5 mm to 1 mm, and is determined according to the design of the focal length. The size of the diameter of the collimated light emitted from the light emitting module 2 is, for example, about 0.5 mm.

Figure 7:
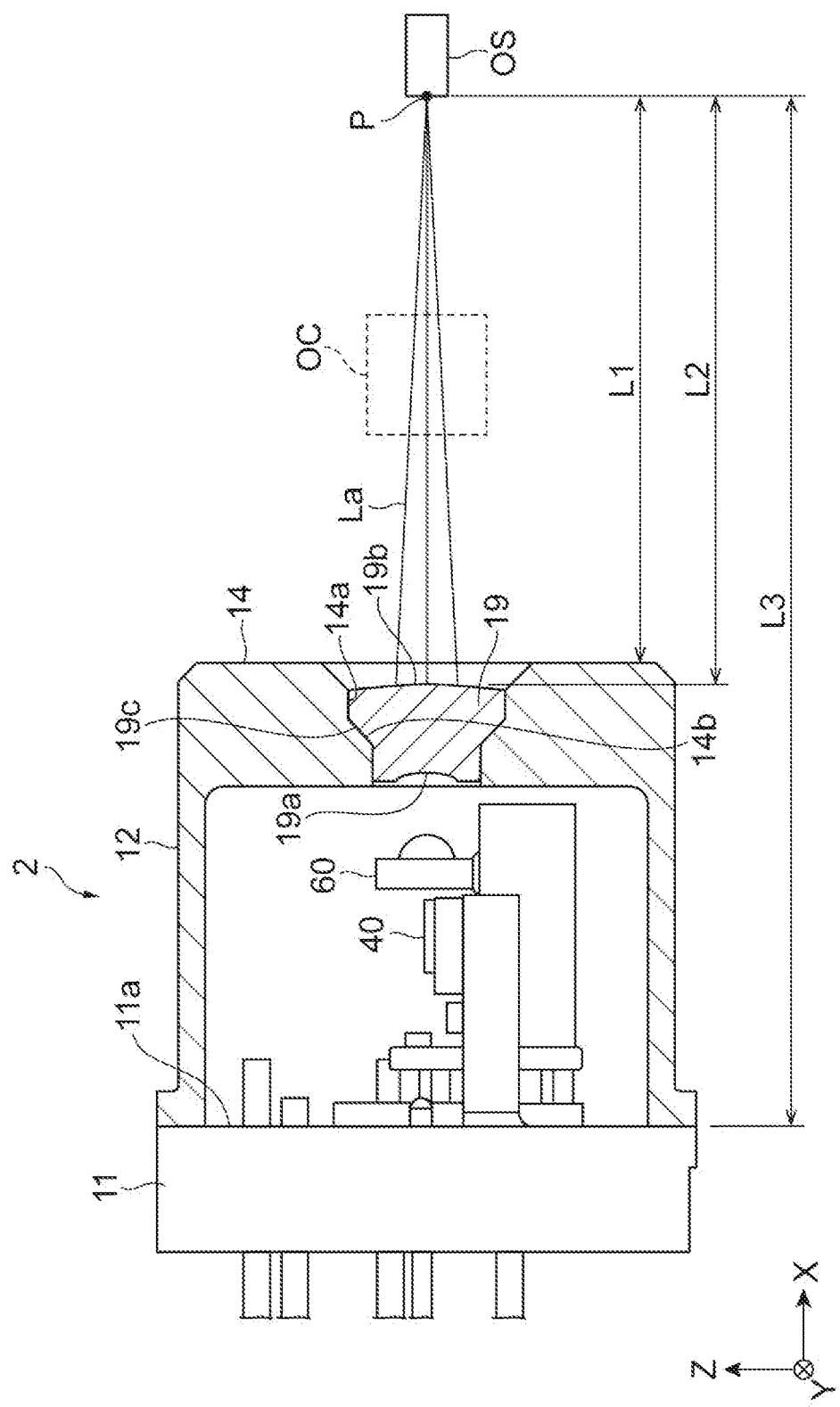
FIG. 7 is a cross-sectional view of the light emitting module in a cross-section along the optical axis direction.

FIG. 7 is a cross-sectional view of the light emitting module 2 in a cross-section taken along the optical axis direction. As described above, the light emitting module 2 further includes the condenser lens 19. The condenser lens 19 is a resin lens or a glass lens. The condenser lens 19 is optically coupled to the semiconductor laser chip 40 through the lens 60, and condenses the collimated light emitted from the lens 60 to a focus point P. This condensed light is optically coupled to the optical fiber stub OS located inside the sleeve 5, and is optically coupled to the optical fiber through the optical fiber stub OS. The shape of the condenser lens 19 when viewed in the optical axis direction is, for example, a circular shape. The end wall 14 of the cap 12 is provided with the circular opening 14a through which the light output from the semiconductor laser chip 40 passes. The condenser lens 19 is fitted to the opening 14a to be fixed to the end wall 14. The optical axis of the lens 60 matches the optical axis of the condenser lens 19.

As described above, the isolator and the wavelength demultiplexing filter are disposed between the light emitting module 2 and the focus point P. A barrel for guiding the reception light to the light receiving module 3 may be disposed between the light emitting module 2 and the focus point P. For example, optical members such as an isolator, a wavelength demultiplexing filter, and a barrel may be disposed between the condenser lens 19 and the optical fiber stub OS. Thus, a distance L1 from the outer surface of the end wall 14 to the focus point P is set to 6 mm or more, for example, 6.6 mm A distance L2 (back focus) from a light exiting surface 19b of the condenser lens 19 to the focus point P is set to 6 mm or more (for example, 6.75 mm) A distance L3 from the main surface 11a of the stein 11 to the focus point P is set to 12 mm or more (for example, 12.2 mm).

The numerical aperture (NA) of the semiconductor laser chip 40 is, for example, 0.5, and the NA of the optical fiber stub OS disposed in the sleeve 5 is, for example, 0.1. In order to achieve high optical coupling therebetween, the image magnification of the lens system including the lens 60 and the condenser lens 19 may be set to 5 times or more (for example, 5.4 times). As an example, the focal length of the lens 60 is set to 0.65, and the focal length of the condenser lens 19 is set to 3.52.

When the distance L2 is 6 mm or more, the distance is remarkably longer than the general distance (about 3 to 4 mm) of two lens systems. Thus, a meniscus lens is used as the condenser lens 19. The condenser lens 19 includes the light entering surface 19a and the light exiting surface 19b. The light entering surface 19a is a curved surface, and is concave toward the light exiting surface 19b. The light exiting surface 19b is a curved surface, and is convex toward the side opposite to the light entering surface 19a. The curvature of the light exiting surface 19b is larger than the curvature of the light entering surface 19a. Since the condenser lens 19 is the meniscus lens, the back focus of, for example, 6 mm or more can be set. Furthermore, the side surface of the condenser lens 19 is provided with a step 19c, and the outer diameter of the condenser lens 19 on the light exiting surface 19b side is larger than the outer diameter of the condenser lens 19 on the light entering surface 19a side. The step 19c comes into contact with a step 14b formed on the inner surface of the opening 14a to determine the relative position of the condenser lens 19 with respect to the cap 12 in the optical axis direction.

Figure 8A:
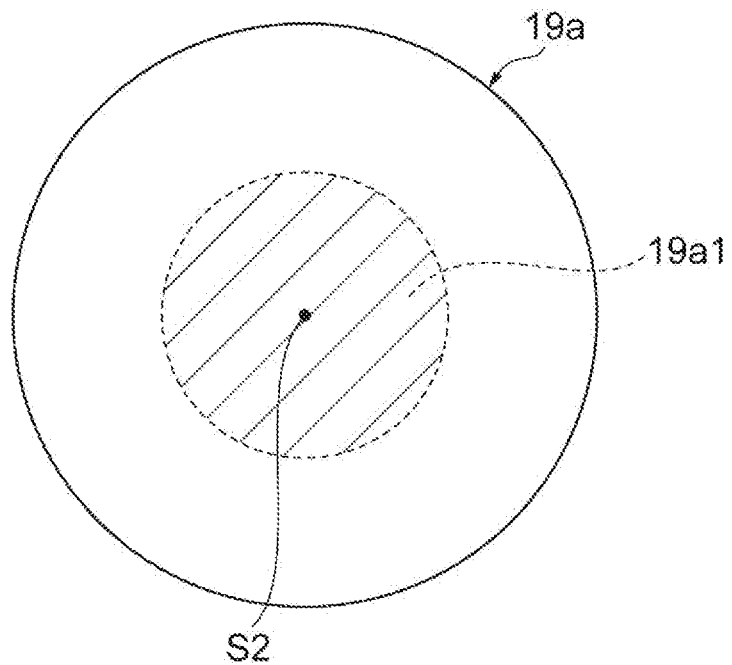
FIG. 8A is a front view illustrating a light entering surface of a condenser lens when viewed in the optical axis direction.
Figure 8B:
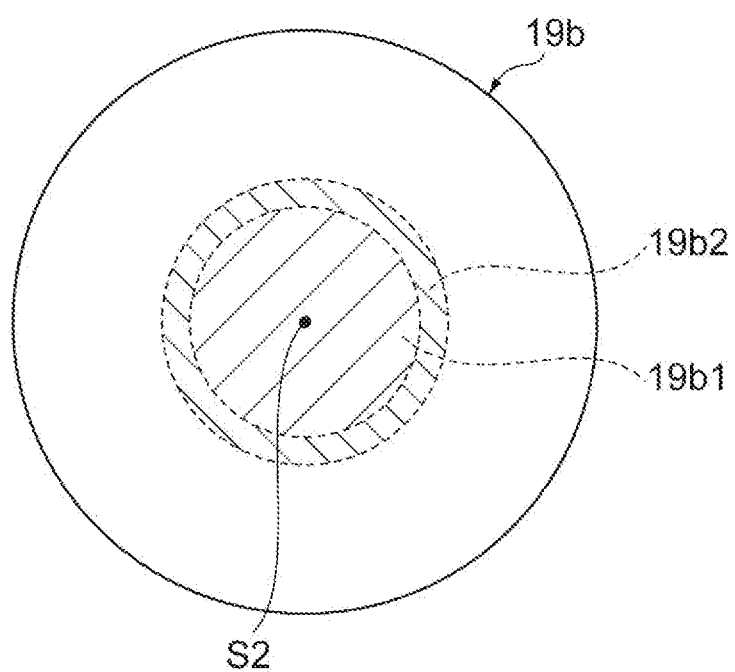
FIG. 8B is a rear view illustrating a light exiting surface of the condenser lens when viewed in the optical axis direction.

Here, a detailed shape of the condenser lens 19 will be described. FIG. 8A is a front view illustrating the light entering surface 19a as viewed in the optical axis direction. As illustrated in FIG. 8A, the light entering surface 19a includes a single region 19a1 (hatched part of the drawing). The region 19a1 is a circular region, and the center matches a center axis (optical axis) S2 of the condenser lens 19. A range (effective lens diameter) to which light is incident in the light entering surface 19a matches the region 19a1. FIG. 8B is a rear view illustrating the light exiting surface 19b as viewed in the optical axis direction. As illustrated in FIG. 8B, the light exiting surface 19b includes a region 19b1 (first region) and a region 19b2 (second region). The region 19b1 is a circular region, and the center matches the center axis (optical axis) S2 of the condenser lens 19. The region 19b2 is an annular region which surrounds the region 19b1, and the center matches the center axis (optical axis) S2 of the condenser lens 19. In the embodiment, the region 19b1 and the region 19b2 are adjacent to each other. A range (effective lens diameter) to which light is output to the light exiting surface 19b matches a region obtained by combining the regions 19b1 and 19b2.

Figure 9A:
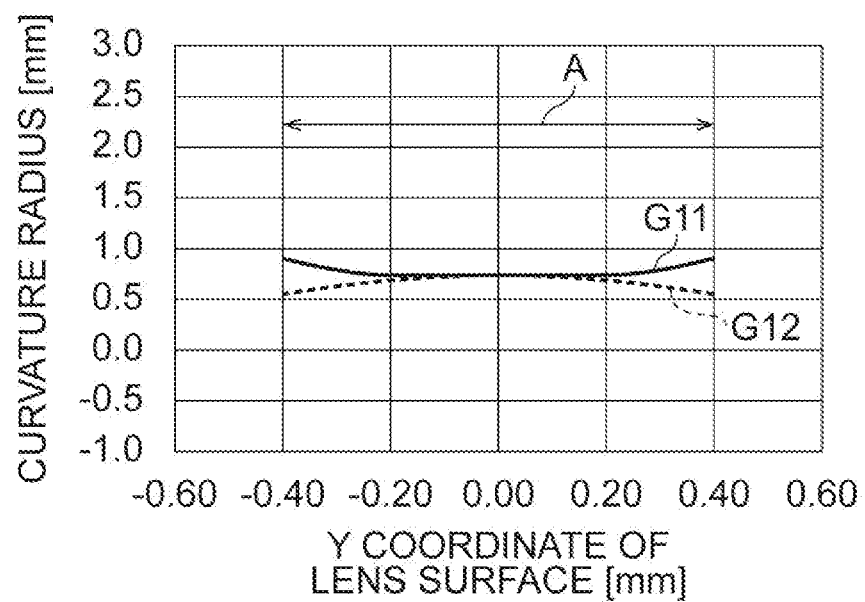
FIGS. 9A and 9B are graphs illustrating one example of a relationship between a curvature radius of the light entering surface and a distance from an optical axis of the light emitting module in a cross-section including the optical axis.
Figure 9B:
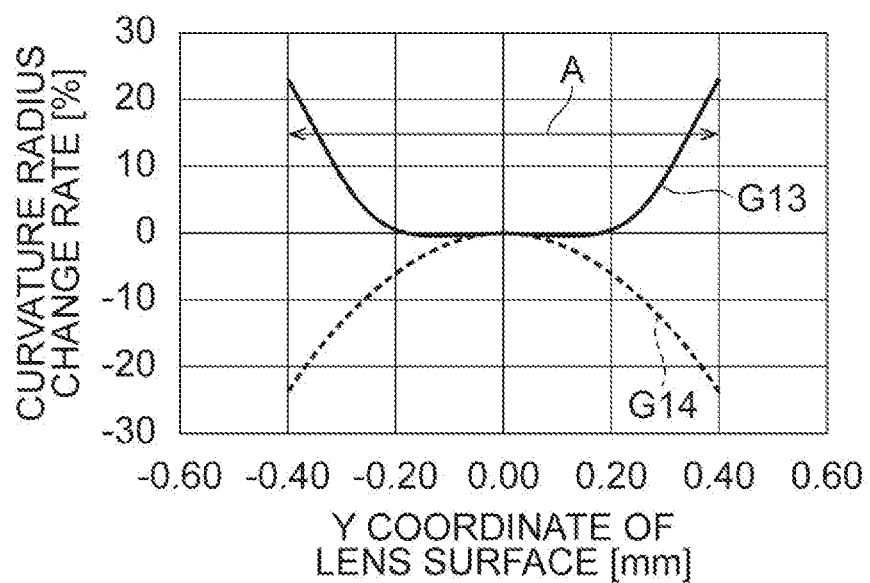

Graph G11 illustrated in FIG. 9A and Graph G13 illustrated in FIG. 9B are graphs illustrating one example of a relationship between the distance from the optical axis S2 and the curvature radius of the light entering surface 19a in the cross-section including the optical axis S2. The horizontal axis indicates a coordinate position (unit mm) in a direction orthogonal to the optical axis S2. The origin is the optical axis S2. The vertical axis of FIG. 9A indicates a curvature radius (unit: mm) The vertical axis of FIG. 9B indicates an increase and decrease rate (unit: %) of the curvature radius with respect to the lens center. For comparison, FIGS. 9A and 9B respectively illustrate Graphs G12 and G14 for the conventional light entering surface. An arrow A in the drawings indicates a range of the region 19a1. In this example, the region 19a1 is set to a range in which the distance from the optical axis is 0.40 mm or less. In Example and Comparative Example, since the back focus (distance L2) is 6.75 mm and the focal length of the condenser lens 19 is 3.52 mm, the curvature radius of the light entering surface 19a on the optical axis S2 is set to 0.75 mm and the curvature radius of the light exiting surface 19b on the optical axis S2 is set to 1.1 mm.

As indicated by Graphs G11 and G13, the light entering surface 19a of the condenser lens 19 has a cross-sectional shape in which the increase rate of the curvature radius with respect to the distance from the optical axis S2 is zero (0) or more in the entire range of the region 19a1. Here, the "increase rate of the curvature radius" means a ratio ($\Delta R/\Delta Y$) between a minute increase amount $\Delta Y$ of the distance from the optical axis S2 and an increase amount $\Delta R$ of the curvature radius. The light entering surface 19a of the embodiment is a concave curved surface, but the sign of the curvature radius is defined as positive. The curvature radius of the light entering surface 19a is the smallest in the optical axis S2, and increases as the distance from the optical axis S2 increases. In an example, the curvature radius is constant until the distance from the optical axis S2 exceeded a range from −0.15 mm to +0.15 mm, and the curvature radius gradually increases from a position in which the distance from the optical axis S2 is −0.15 mm or +0.15 mm. In Graphs G12 and G14 of Comparative Example, the increase rate of the curvature radius with respect to the distance from the optical axis S2 is zero (0) or less. That is, the curvature radius of the light entering surface is the largest in the optical axis S2, and decreases as the distance from the optical axis S2 increases.

Figure 10A:
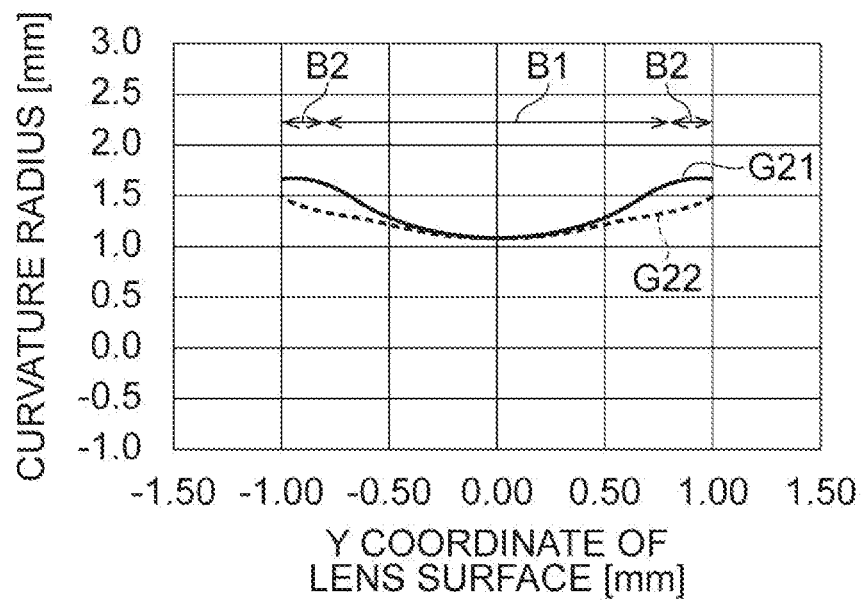
FIGS. 10A and 10B are graphs illustrating one example of a relationship between a curvature radius of the light exiting surface and a distance from the optical axis in a cross-section including the optical axis.
Figure 10B:
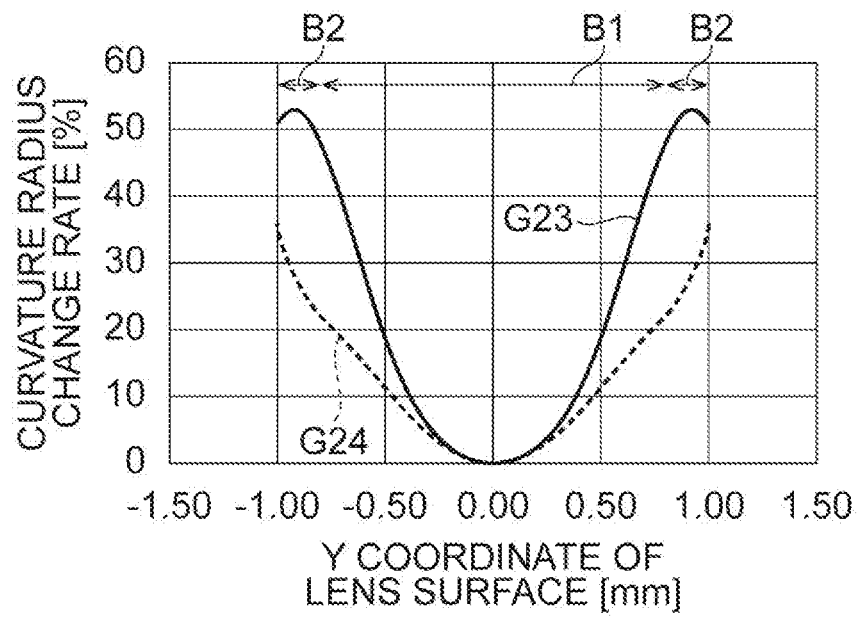

Graph G21 illustrated in FIG. 10A and Graph G23 illustrated in FIG. 10B are graphs illustrating one example of a relationship between the curvature radius of the light exiting surface 19b and the distance from the optical axis S2 in the cross-section including the optical axis S2. The horizontal axis indicates a coordinate position (unit mm) in a direction orthogonal to the optical axis S2. The origin indicates the optical axis S2. The vertical axis of FIG. 10A indicates a curvature radius (unit: mm) The vertical axis of FIG. 10B indicates an increase and decrease rate (unit: %) of the curvature radius with respect to the lens center. For comparison, FIGS. 10A and 10B respectively illustrate Graphs G22 and G24 for the conventional light exiting surface. An arrow B1 in the drawings indicates a range of the region 19b1. In this example, the region 19b1 is set to a range in which the distance from the optical axis S2 is within a range from −0.80 mm to +0.80 mm. An arrow B2 in the drawings indicates a range of the region 19b2. In this example, the region 19b2 is set to a range in which the distance from the optical axis S2 is within a range from +0.80 to +1.00 mm and to a range in which the distance from the optical axis S2 is within a range from −0.80 to −1.00 mm.

As indicated by Graphs G21 and G23, the light exiting surface 19b of the condenser lens 19 has a cross-sectional shape in which the sign of the increase rate of the curvature radius with respect to the distance from the optical axis S2 is positive in the range of the region 19b1. The light exiting surface 19b has a cross-sectional shape in which the sign of the increase rate of the curvature radius with respect to the distance from the optical axis S2 is negative in the range of the region 19b2 surrounding the region 19b1. The definition of the increase rate of the curvature radius is the same as that of the light entering surface 19a. The light exiting surface 19b of the embodiment is a concave curved surface, but the sign of the curvature radius is defined as positive similarly to the light entering surface 19a. The curvature radius of the region 19b1 is the smallest in the optical axis S2, and increases as the distance from the optical axis S2 increases. The curvature radius of the region 19b2 is the largest in the optical axis S2, and decreases as the distance from the optical axis S2 increases. In Graphs G22 and G24 of Comparative Example, the sign of the increase rate of the curvature radius with respect to the distance from the optical axis S2 is positive in both of the regions 19b1 and 19b2. That is, the curvature radius of the light entering surface is the smallest in the optical axis S2, and increases as the distance from the optical axis S2 increases, regardless of region. The inner diameter of the region 19b2 is, for example, 80% of the outer diameter of the region 19b2.

An operation and effect obtained by the light emitting module 2 of the embodiment described above will be described. In the light emitting module 2, the light output from the semiconductor laser chip 40 first reaches the lens 60, and is output from the lens 60 as collimated light. Next, the collimated light reaches the condenser lens 19, and is condensed by the condenser lens 19. Since the light emitting module 2 includes two lens systems including the lens 60 and the condenser lens 19, alignment accuracy is high as compared with a case in which a single lens is included. Accordingly, the light coupling efficiency between the semiconductor laser chip 40 and the optical fiber can be improved. Further, since the condenser lens 19 is the meniscus lens, the back focus of the condenser lens 19 can be lengthened.

In the meniscus lens, the positional shift (axial shift), that is, the decentering between the optical axis of the light entering surface and the optical axis of the light exiting surface affects the light coupling efficiency between the semiconductor laser chip 40 and the optical fiber. In order to prevent a decrease in light coupling efficiency caused by the decentering, in the embodiment, the increase rate of the curvature radius with respect to the distance from the optical axis is zero (0) or more in the light entering surface 19a of the condenser lens 19 (see Graphs G11 and G13 of FIGS. 9A and 9B). Additionally, in the light exiting surface 19b of the condenser lens 19, the sign of the increase rate of the curvature radius with respect to the distance from the optical axis is positive in the region 19b1 and the sign of the increase rate of the curvature radius with respect to the distance from the optical axis is negative in the region 19b2 surrounding the region 19b1 (see Graphs G21 and G23 of FIGS. 10A and 10B).

In Example and Comparative Example, it is examined how the aberration of the condenser lens and the coupling efficiency between the semiconductor laser chip 40 and the optical fiber are different. In Example, the condenser lens 19 is used. The condenser lens 19 includes the light entering surface 19a having a shape illustrated in Graphs G11 and G13 of FIGS. 9A and 9B and the light exiting surface 19b having a shape illustrated in Graphs G21 and G23 of FIGS. 10A and 10B. In Comparative Example, the condenser lens is used. The condenser lens includes the light entering surface having a shape illustrated in Graphs G12 and G14 of FIGS. 9A and 9B and the light exiting surface having a shape illustrated in Graphs G22 and G24 of FIGS. 10A and 10B.

Figure 11:
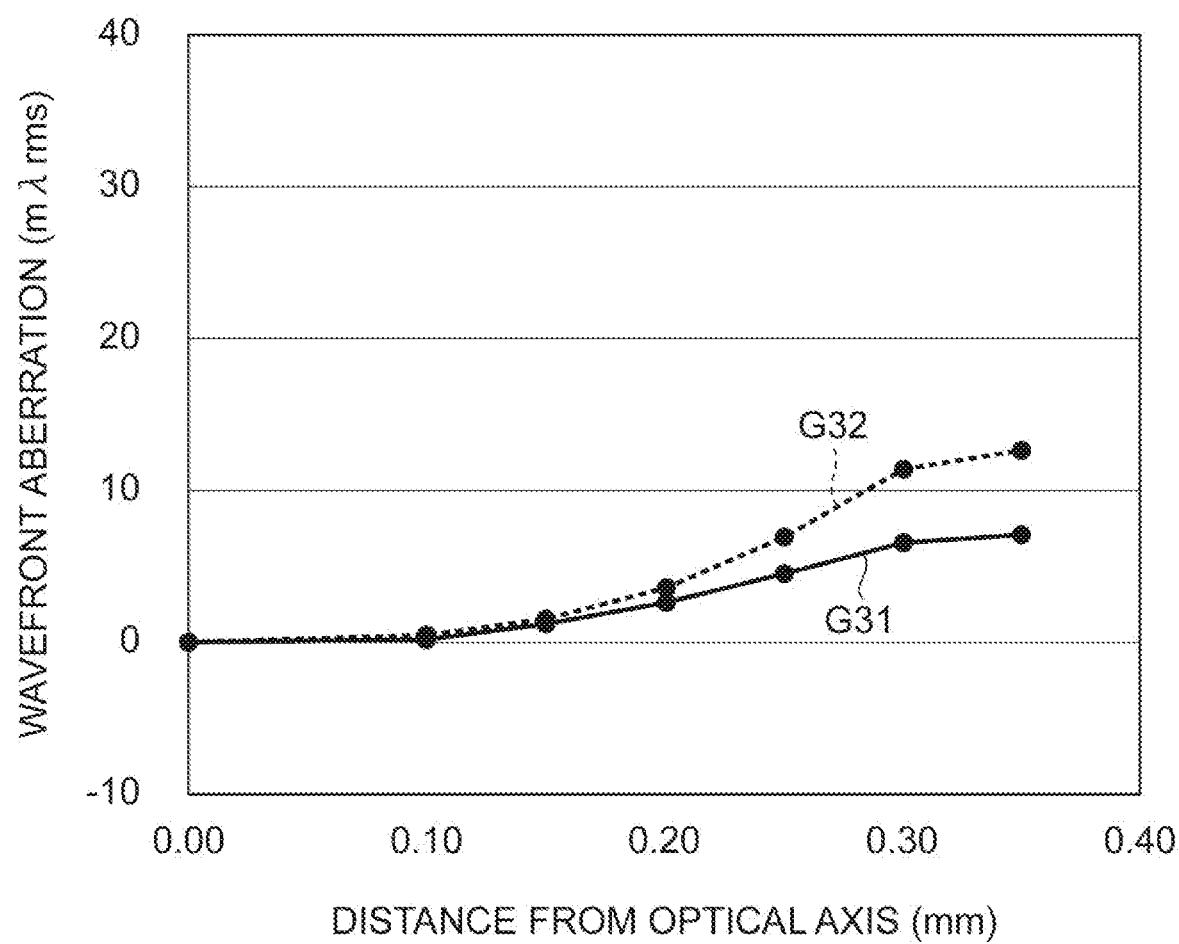
FIG. 11 is a graph illustrating a relationship between a wavefront aberration and a distance from the optical axis when decentering is within a range from −5 μm to +5 μm.

FIG. 11 is a graph illustrating a relationship between the wavefront aberration and the distance from the optical axis S2 when the decentering is within a range from −5 μm to +5 μm. In FIG. 11, Graph G31 indicates the wavefront aberration of the condenser lens 19 of Example. Graph G32 indicates the wavefront aberration of the condenser lens of Comparative Example. As illustrated in FIG. 11, the wavefront aberration of the condenser lens 19 of Example decreases remarkably as compared with the wavefront aberration of the condenser lens of Comparative Example. Specifically, a position in which the distance from the optical axis S2 is 0.15 mm served as a branch point, and a difference in wavefront aberration of Example and Comparative Example is the same up to 0.15 mm but increases as the distance from the optical axis S2 increases in a region exceeding 0.15 mm. For example, in Comparative Example, when the distance from the optical axis S2 exceeds 0.30 mm, the wavefront aberration exceeds 10 mλrms. In contrast, in Example, the wavefront aberration is suppressed to 7 mλrms or less regardless of the distance from the optical axis S2. Further, in a region in which the distance from the optical axis S2 exceeds 0.30 mm, the wavefront aberration of Example is improved by 5 mλrms or more with respect to the wavefront aberration of Comparative Example.

Figure 12:
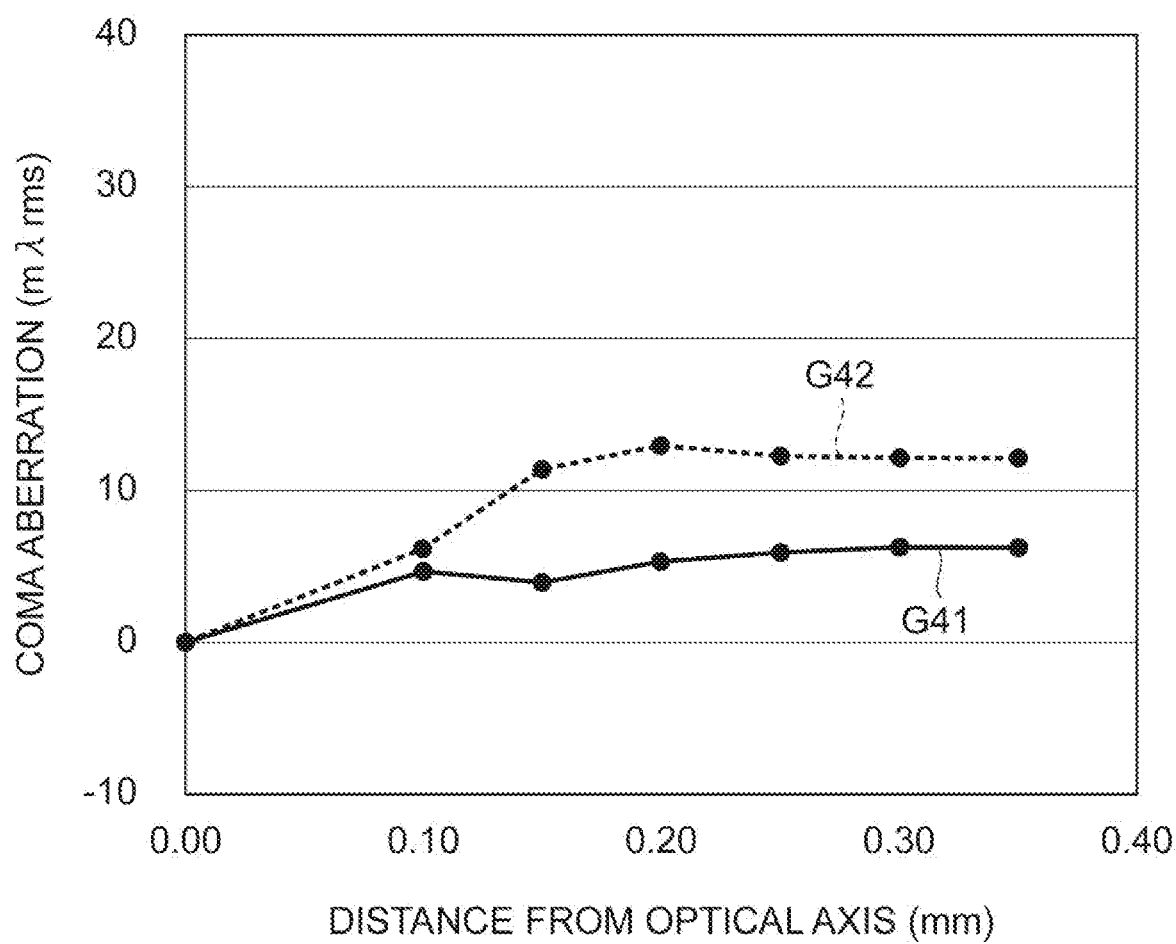
FIG. 12 is a graph illustrating a relationship between a coma aberration and a distance from the optical axis when decentering is within a range from −5 μm to +5 μm.

FIG. 12 is a graph illustrating a relationship between the coma aberration and the distance from the optical axis S2 when the decentering is within a range from −5 μm to +5 μm. In FIG. 12, Graph G41 indicates the coma aberration of the condenser lens 19 of Example. Graph G42 indicates the coma aberration of the condenser lens of Comparative Example. As illustrated in FIG. 12, the coma aberration of the condenser lens 19 of Example decreases remarkably as compared with the coma aberration of the condenser lens of Comparative Example. Specifically, a position in which the distance from the optical axis S2 is 0.10 mm served as a branch point, and the coma aberration of Example is the same up to 0.10 mm but stably decreases with respect to the coma aberration of Comparative Example in a region exceeding 0.10 mm. For example, in Comparative Example, when the distance from the optical axis S2 exceeds 0.15 mm, the coma aberration exceeds 10 mλrms. In contrast, in Example, the coma aberration is suppressed to 6 mλrms or less regardless of the distance from the optical axis S2. Further, in a region in which the distance from the optical axis S2 exceed 0.10 mm, the coma aberration of Example is improved by 5 mλrms or more with respect to the coma aberration of Comparative Example.

Figure 13:
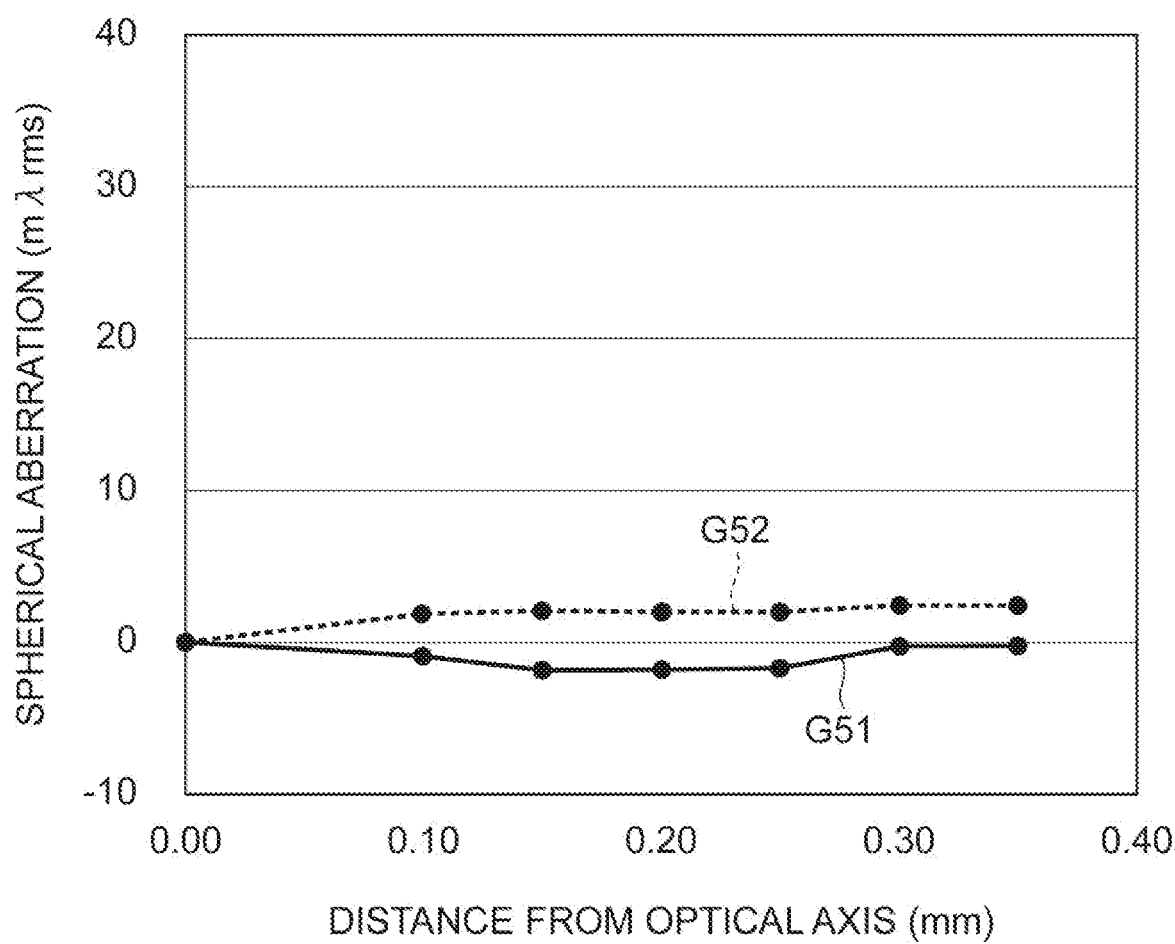
FIG. 13 is a graph illustrating a relationship between a spherical aberration and a distance from the optical axis when decentering is within a range from −5 μm to +5 μm.

FIG. 13 is a graph illustrating a relationship between the spherical aberration and the distance from the optical axis S2 when the decentering is within a range from −5 μm to +5 μm. In FIG. 13, Graph G51 indicates the spherical aberration of the condenser lens 19 of Example. Graph G52 indicates the spherical aberration of the condenser lens of Comparative Example. As illustrated in FIG. 13, the spherical aberration of the condenser lens 19 of Example decreases remarkably as compared with the spherical aberration of the condenser lens of Comparative Example. Particularly, in a region in which the distance from the optical axis S2 exceeds 0.30 mm, the spherical aberration is substantially zero. Further, in a region in which the distance from the optical axis S2 exceeds 0.10 mm, the spherical aberration of Example is improved by 3.4 mλrms or more with respect to the spherical aberration of Comparative Example.

FIGS. 14A and 14B are diagrams schematically illustrating a state in which the light passing through the condenser lens 19 is divided into an inner beam BA and an outer beam BB. Table 1 below illustrates a relationship between the distance from the optical axis S2 and a ratio in which the outer beam BB is coupled to the optical fiber (a ratio of the amount of the light incident to the optical fiber in the beam BB passing through the condenser lens 19) in each of Example and Comparative Example. A ratio in which the outer beam BB is coupled to the optical fiber is a ratio of the amount of light entering the optical fiber in the beam BB passing through the condenser lens 19. That is, Table 1 illustrates how much the light at the tail of the collimated light (Gaussian beam) contributes to the coupling efficiency.

TABLE 1

| Distance from optical axis S2 | Comparative Example | Example | Improvement rate |
|---|---|---|---|
| 0.1 μm | 62.5% | 62.6% | 0.1% |
| 0.15 μm | 47.1% | 47.3% | 0.4% |
| 0.20 μm | 31.5% | 32.6% | 3.4% |
| 0.25 μm | 16.0% | 16.9% | 6.1% |
| 0.30 μm | 7.5% | 8.9% | 18.6% |
| 0.35 μm | 0.0% | 0.0% | 0.0% |

Figure 15:
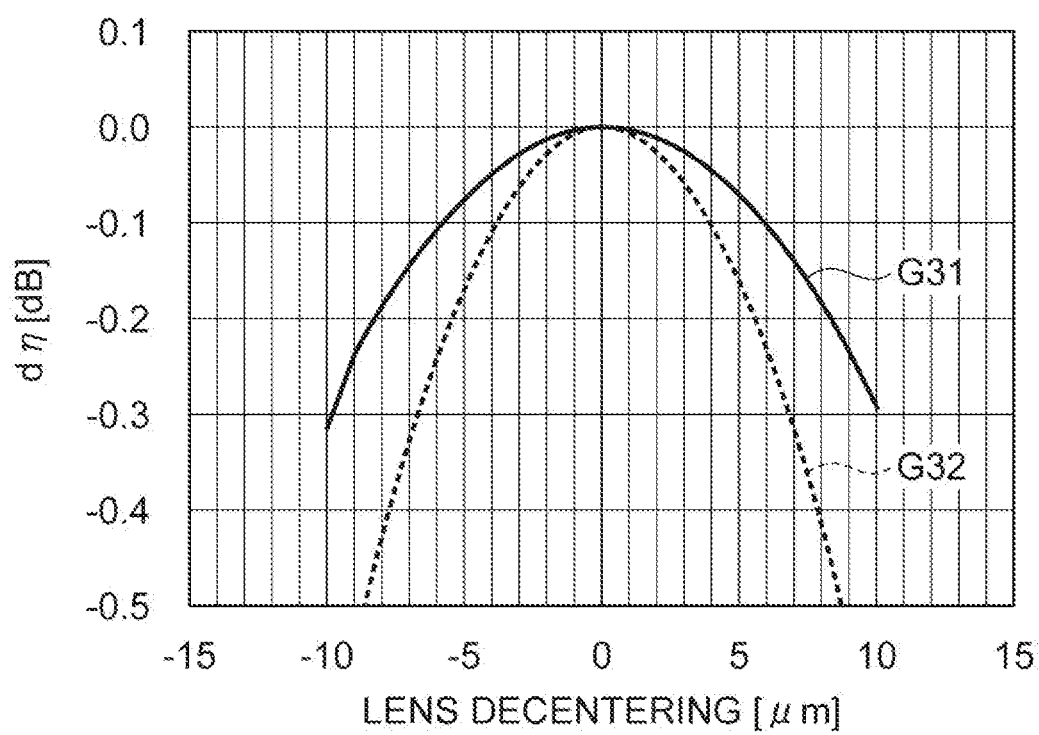
FIG. 15 is a graph showing a relationship between decentering of the condenser lens and a decrease amount $d\eta$ of light coupling efficiency between a semiconductor laser chip and an optical fiber.

FIG. 15 is a graph illustrating a relationship between the decentering of the condenser lens 19 and the decrease amount dη of the light coupling efficiency between the semiconductor laser chip 40 and the optical fiber. The horizontal axis indicates decentering (unit: μm) of the condenser lens 19. The vertical axis indicates a decrease amount dη (unit: dB) of the light coupling efficiency when the decentering is 0 μm. Graph G31 indicates Example and Graph G32 indicates Comparative Example. Referring to FIG. 15, in Comparative Example (Graph G32), when the decentering is within a range from −5 μm to +5 μm, the decrease amount dη of the light coupling efficiency was about 0.2 dB. In contrast, in Example (Graph G31), when the decentering is within from −5 μm to +5 μm, the decrease amount dη of the light coupling efficiency is decreased to 0.075 dB. In this way, in Example, a degree by which the outer beam BB contributes to the coupling efficiency with the optical fiber is improved, and a decrease in light coupling efficiency with respect to the decentering is presented. This is an effect obtained by reducing the wavefront aberration, the coma aberration, and the spherical aberration. That is, according to the condenser lens 19 of the embodiment, a decrease degree of the light coupling efficiency due to the decentering can be reduced.

In the embodiment, the package 10 includes the opening 14a through which the light output from the semiconductor laser chip 40 passes. The condenser lens 19 may be attached to the opening 14a. Accordingly, a small light emitting module 2 can be provided as compared with a case in which the condenser lens 19 is located outside the package 10.

In the embodiment, the back focus (the distance L2) of the condenser lens 19 may be 6 mm or more. The light emitting module 2 of the embodiment can achieve a long back focus as above.

The light emitting module according to the present disclosure is not limited to the above-described embodiment and can be modified into various other forms. For example, in the above-described embodiment, a case in which the condenser lens 19 is attached to the end wall 14 of the package 10 has been exemplified, but the condenser lens 19 may be attached to a component other than the package 10. In that case, the condenser lens 19 may be disposed outside the package 10 or may be disposed inside the package 10.

What is claimed is:

1. A light emitting module comprising:
   a semiconductor light emitting element;
   a first lens optically coupled to the semiconductor light emitting element to collimate light output from the semiconductor light emitting element;
   a second lens which is a meniscus lens optically coupled to the semiconductor light emitting element through the first lens to condense the collimated light; and
   an optical fiber stub optically coupled to condensed light output from the second lens,
   wherein a light entering surface of the second lens has a cross-sectional shape in which an increase rate of a curvature radius with respect to a distance from an optical axis of the second lens is zero or more, and
   wherein a light exiting surface of the second lens includes:
   a first region having a cross-sectional shape in which a sign of the increase rate of the curvature radius with respect to the distance from the optical axis is positive, and
   a second region surrounding the first region and having a cross-sectional shape in which a sign of the increase rate of the curvature radius with respect to the distance from the optical axis is negative.

2. The light emitting module according to claim 1, further comprising:
   a package accommodating the semiconductor light emitting element and the first lens therein, the package having an opening through which light output from the semiconductor light emitting element passes and the second lens being attached in the opening.

3. The light emitting module according to claim 1, wherein a back focus of the second lens is 6 mm or more.

4. The light emitting module according to claim 1, further comprising:
   an optical member disposed between the second lens and the optical fiber stub.

5. The light emitting module according to claim 1, wherein a multiplication rate of a lens system including the first lens and the second lens is 5 times or more.

6. The light emitting module according to claim 1, wherein the first region has a circular shape centered on the optical axis.

7. The light emitting module according to claim 6, wherein the second region has an annular shape centered on the optical axis.

* * * * *